UNITED STATES PATENT OFFICE.

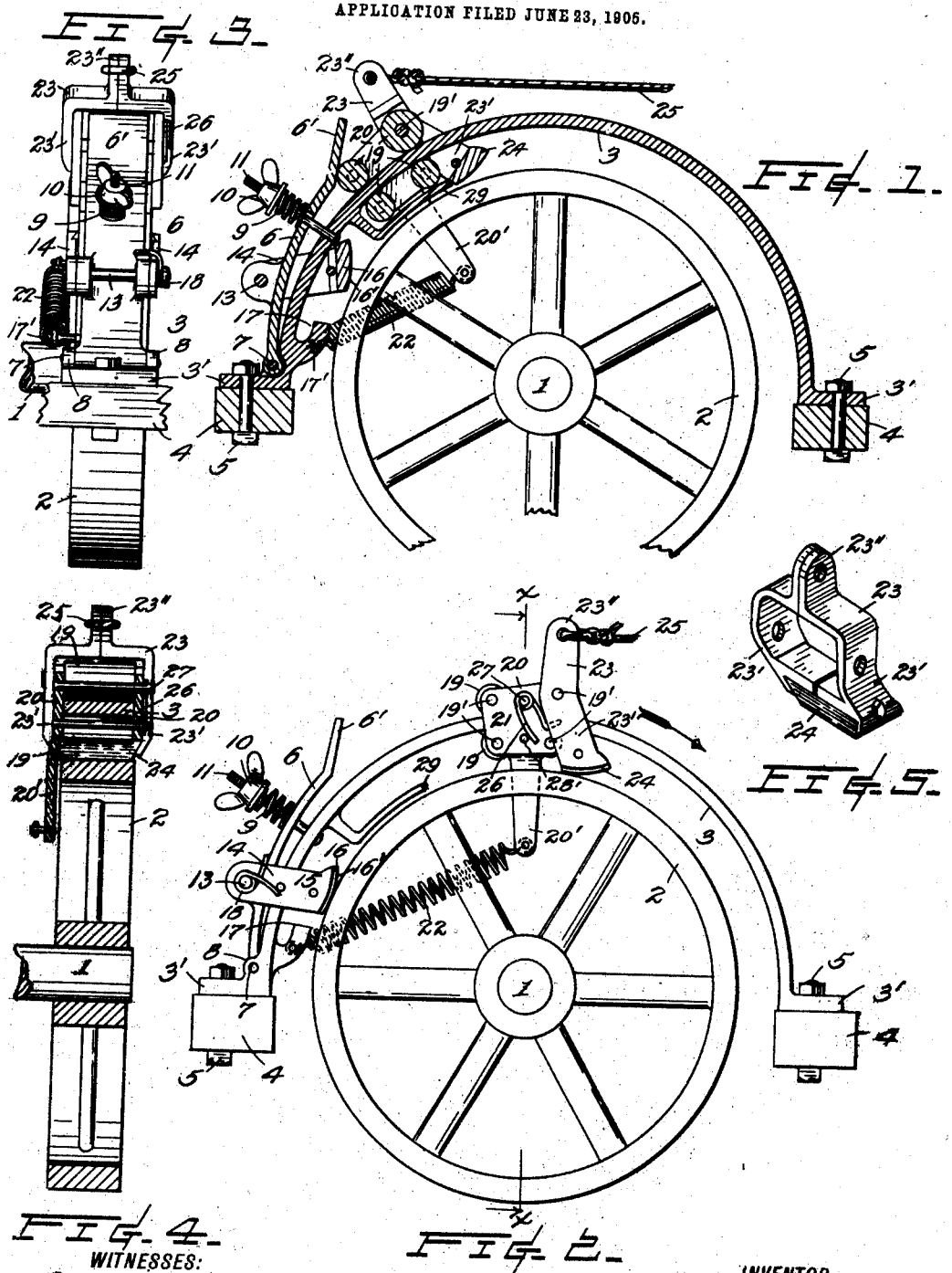

SAMUEL G. GEORGE, OF SEATTLE, WASHINGTON.

COMBINED STARTING AND RETROGRADE BRAKING MECHANISM FOR GASOLENE-ENGINES.

No. 866,456.

Specification of Letters Patent.

Patented Sept. 17, 1907.

Application filed June 23, 1905. Serial No. 266,583.

*To all whom it may concern:*

Be it known that I, SAMUEL G. GEORGE, a citizen of the United States, residing at Seattle, in the county of King and State of Washington, have invented certain new and useful Improvements in a Combined Starting and Retrograde Braking Mechanism for Gasolene-Engines, of which the following is a specification, reference being had therein to the accompanying drawing, in which—
Figure 1 is a longitudinal vertical section of devices embodying my invention; Fig. 2, a side elevation of the same; Fig. 3, an end elevation of Fig. 1; Fig. 4, a sectional view taken on line x—x of Fig. 2; and Fig. 5, a perspective view of the power lever detached.
This invention relates to gasolene engines and while it may be usefully employed in other relations, is especially valuable in this connection.

In starting gasolene engines it is necessary to compress the gases already within the cylinder upon one side of the piston for ignition and create a partial vacuum upon the other side to form a suction for the intake of the gases thereat and this is accomplished by rotating through an external medium the engine fly wheel. Oftentimes, too, in thus starting an engine the operator requires to use the utmost precaution to avoid being injured by a "kicking" or reverse motion being given the fly wheel through the occurrence of premature explosions of the power agent within the cylinder. In certain situations where gasolene engines are commonly used, notably on automobiles, the difficulty in starting the engine and the risk of being injured from the back lash caused by a premature explosion are particularly objectionable and dangerous from the fact of the engine's being placed in an out-of-the-way position.

The object of the present invention is to overcome the aforementioned inconveniences and danger, which I attain by the peculiar construction and adaptation of devices hereinafter described and pointed out in the appended claims.

In the drawings the reference numeral 1 designates the shaft of a gasolene engine to which is to be imparted a rotary motion in starting and is provided with a fly wheel 2.
A curved track-plate 3, concentric of the wheel axis, is secured in a rigid and substantial manner to supporting frame-work 4 as by bolts 5 passing through the latter and the feet 3′ of the plate.

A segmental shaped leaf 6 is hinged at one end by a pivotal pin 7 to lugs 8 formed or provided on the outside of the track plate in proximity of one of said feet and the other end of the leaf terminates in an outwardly inclined portion 6′. This hinged leaf is re-
siliently pressed toward the said plate by a spring 9 interposed between the leaf and a butterfly nut 10 which is adjustable upon a screw-threaded bolt 11 fastened at its inner end to said plate and passing through an elongated aperture of the leaf.

Tiltably attached to the leaf, as by a pin 13 and arms 14, is a brake member 15 carrying at its inner end a brake shoe 16, desirably formed of wood fiber or the like, and having a face 16′ which is eccentric of the member's suspension point so that when the leaf is pressed inwardly by the spring, as aforesaid, and the shoe face is in contact with the periphery of the wheel any retrograde motion of the latter will cause a wedging effect tending to compress said spring. To prevent the shoe, however, being carried backwardly beyond a radial plane projected through the axes of the wheel and the pin 13, I provide a stop 17 on the plate 3 against which the brake member will strike and in so doing it forces the leaf outwardly and disengages the shoe from the wheel, when a coil spring 18, having its respective ends engaged with the leaf and the brake member, will throw the latter forwardly to be reengaged with the wheel in an advanced position by the recoil of the spring 9.

Revolubly mounted on the inside and outside of the track-plate are the antifriction rollers 19 having axles 19′ journaled in side plates 20 of a carriage 21 which is normally drawn toward the rear by an extensible spring 22 connected to an arm 20′ of one of said side plates and a suitable attachment or lug on the track plate, as at 17′. A bifurcated lever 23 spans the carriage at its forward end and is fulcrumed thereto, conveniently by utilizing the protruding ends of one of the roller axles 19′. Between the double arm 23′ of this lever is secured a shoe 24 similar in form and material, preferably, to the before described shoe 16; while the outer arm 23″ is adapted to be connected to a drag line 25 whereby the turning movement of the wheel is accomplished in starting the engine.

The spring 26 coiled about a bolt 27 of the carriage and having one of its ends bear against an abutment or stud 28′ of the latter and the other end against the inner arm of the lever tends to press this arm to disengage the shoe 24 thereof out of contact with the periphery of said wheel.

When the lever arm 23″ is drawn forward by power exerted through the line 25 the brake shoe will be tilted rearwardly, against the action of the last mentioned spring, and cause its being frictionally engaged with the wheel and thus transmit motion to the same and effect its turning in the direction indicated by the arrow in Fig. 2. When the power is released from the drag line the spring 22 draws the carriage in a direction oppositely to that indicated by the arrow and, near the end of this return travel, the rearmost outer roller will contact with the inclined portion 6' of the leaf and, through a wedging action thereunder, force the leaf outwardly to disengage the brake member from the wheel, as clearly illustrated in Fig. 1. Should the power transmitting shoe 24 be engaged with the wheel, in its return movement to the position shown in Fig. 1, as might occur through a reverse rotation of the wheel before the power upon the drag line is discontinued, then the shoe would be positively disengaged by coming in contact with the striking finger 29 formed or provided upon the inner side of the track plate and located so as to engage with the shoe immediately before or simultaneously with the forcing out of the hinged leaf. The drag line 25 is connected to a lever operated by and within easy reach of the operator and which lever can be manipulated either by foot or hand power as is most convenient.

The operation of the invention will be understood, it is thought, from the foregoing but it will be stated that the driving mechanism furnishes the means for rotating the engine shaft to accomplish the starting of the engine as before alluded to, and the brake devices will reliably check any retrograde rotary motion which may be given to the shaft, thus safeguarding the operator should he still have the controlling lever in his hand and yet not stop such reverse motion to jeopardize the safety of the engine itself. In other words, the various features of the invention are so formed and combined as to accommodate themselves to any condition likely to present itself and is a marked improvement in the art to which it relates.

Having described my invention, what I claim as new and desire to secure by Letters-Patent, is—

1. The combination with a wheel, a curved track-plate, a carriage mounted upon said plate and wheel gripping devices carried by said carriage and adapted to engage the wheel when moved in one direction, of a leaf hinged to said plate, and adapted when contacted by the carriage to be tilted outwardly from the plate and against the action of a spring, said spring, and an arm carrying a brake shoe pivotally connected to said leaf.

2. The combination with a wheel and a curved track-plate, of a carriage mounted upon said plate, devices carried on the carriage adapted when moved in one direction to grip the periphery of the wheel and impart a partial rotation to the latter, a spring for returning the carriage to its initial position, and means for holding said devices out of engagement with the wheel during such return movement of the carriage.

3. The combination with a wheel, a curved track-plate, and a carriage mounted upon said track, driving devices provided on the carriage for imparting a rotary motion to the wheel in a single direction only, a brake device adapted to engage with the wheel when the latter is rotating in an opposite direction to that at which the said driving devices are capable of turning said wheel, and means to cause the said brake device to temporarily disengage from the wheel when the latter has made a certain amount of retrograde motion.

4. The combination with a wheel and a leaf hinged to a suitable support, of said support, a brake shoe carried by an arm which is pivotally connected to said leaf, and a spring pressing said leaf toward the wheel.

In testimony whereof I affix my signature in presence of two witnesses.

SAMUEL G. GEORGE.

Witnesses:
 PIERRE BARNES,
 W. H. BENNETT.